United States Patent [19]
Weissfloch et al.

[11] Patent Number: 6,024,123
[45] Date of Patent: Feb. 15, 2000

[54] FLUID DIVERTER SYSTEM

[75] Inventors: Marc Weissfloch, Montreal; Kondandaraman Balasubramanian, Town of Mount Royal, both of Canada

[73] Assignee: Montreal Bronze Foundry Limited, Terrebonne, Canada

[21] Appl. No.: 09/169,718

[22] Filed: Oct. 9, 1998

[51] Int. Cl.[7] .................................................. F16K 11/10
[52] U.S. Cl. ........................ 137/599; 137/883; 251/331
[58] Field of Search ................................. 137/883, 599; 251/331

[56] References Cited

U.S. PATENT DOCUMENTS

| | | | |
|---|---|---|---|
| 2,907,346 | 10/1959 | Fortune | 137/599 |
| 5,065,794 | 11/1991 | Cheung | 137/883 |
| 5,273,075 | 12/1993 | Skaer | 137/883 |
| 5,279,328 | 1/1994 | Linder et al. | 137/599 |
| 5,335,696 | 8/1994 | McKenzie | 137/883 |
| 5,427,150 | 6/1995 | Skaer et al. | 137/883 |
| 5,476,118 | 12/1995 | Yokoyama | 137/599 |
| 5,875,817 | 3/1999 | Carter | 137/599 |

*Primary Examiner*—Stephen M. Hepperle
*Assistant Examiner*—John Bastianelli
*Attorney, Agent, or Firm*—Wallenstein & Wagner, Ltd.

[57] ABSTRACT

A fluid diverter system for diverting a flow of fluid from an inlet port to one or the other of a pair of fluid passages includes a bypass passage which is provided between the fluid passages immediately upstream of a pair of closure members. The pair of fluid passages and bypass passage are adapted to produce turbulence at an entrance area of the bypass passage to prevent stagnation of some of the fluid within the fluid diverter system.

21 Claims, 8 Drawing Sheets

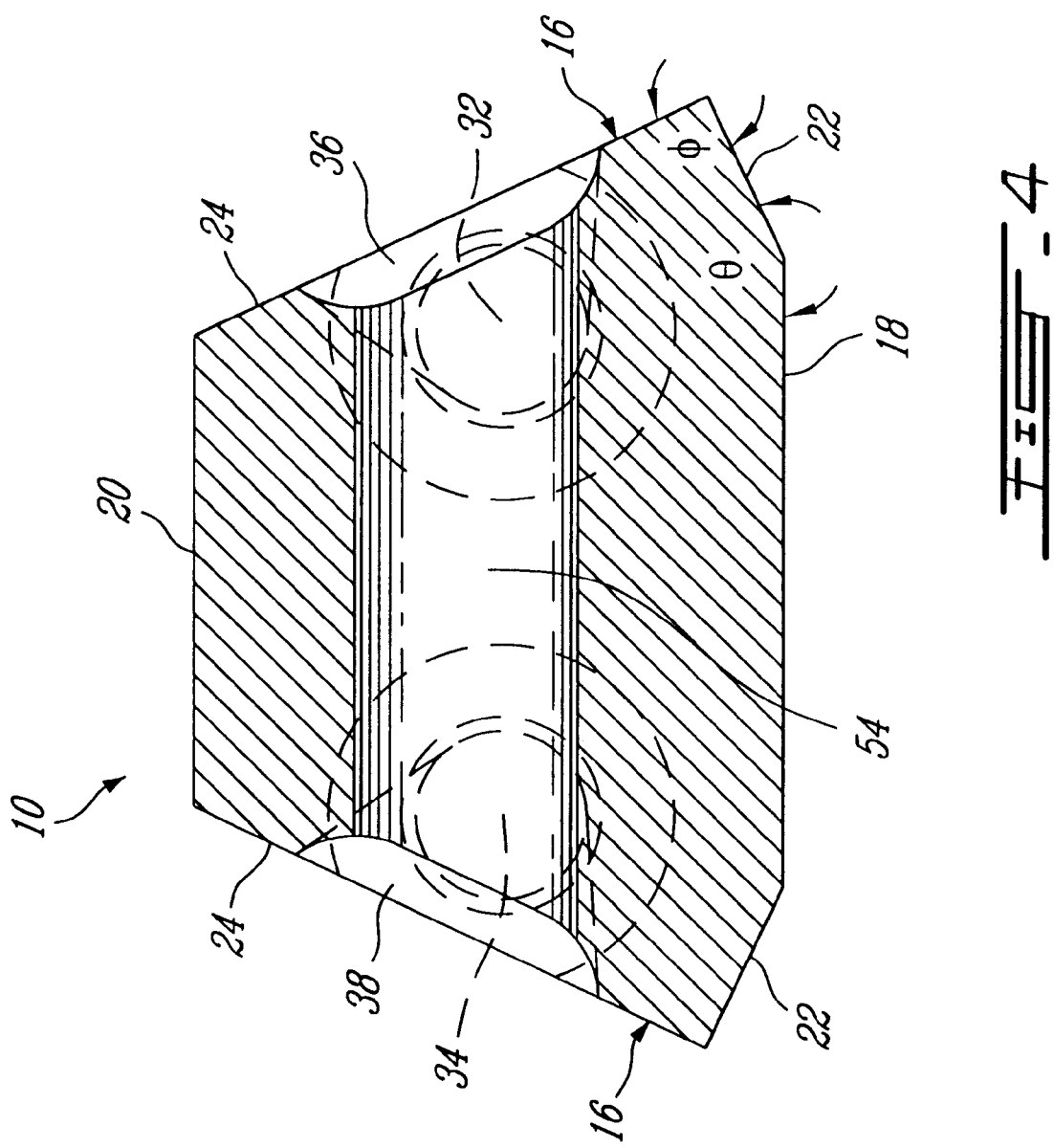

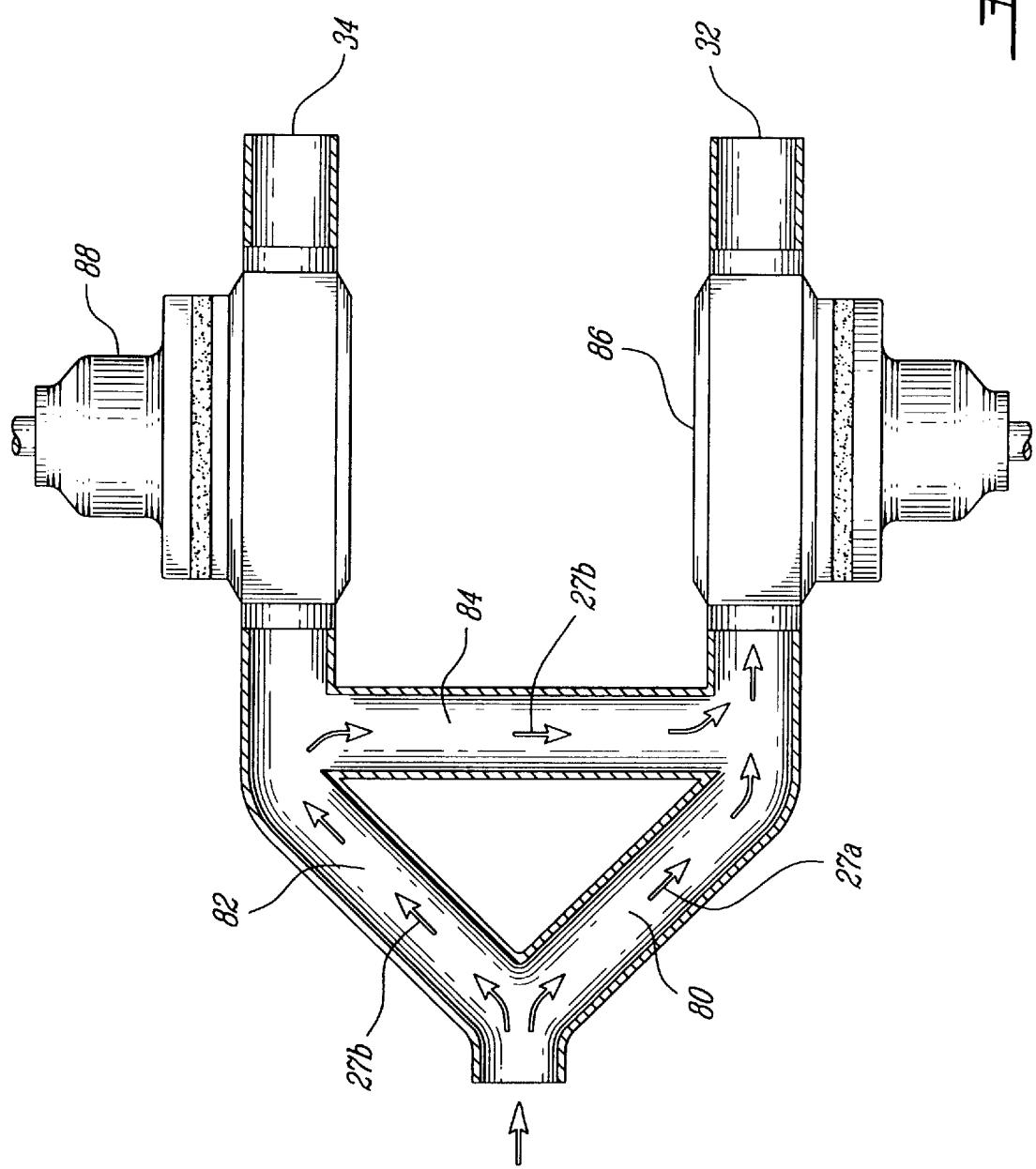

FLUID DIVERTER SYSTEM

BACKGROUND OF THE INVENTION

1. Field of the Invention

The present invention relates to piping systems and, more particularly, pertains to a new fluid diverter system adapted to improve drainage therethrough.

2. Description of the Prior Art

Over the years, various piping systems have been developed to divert or distribute the flow of a wide variety of fluids under various operating conditions. Also known are diaphragm valves, such as the typical diaphragm valve 100 shown in FIGS. 6A and 6B, wherein the valve body 101 has a curved inlet port 102, rising up to a "weir" 104 on which a rubber diaphragm 106 seats and unseats to act as a closing element. The actuation of the diaphragm 106 is normally accomplished by a screw mechanism 108 in a bonnet 110. The valve body 101 defines an outlet port 112. FIG. 6A shows the plunger of the screw mechanism 108 in a lowered position such that the diaphragm 106 sits on the weir 104 thereby closing the valve 100, whereas FIG. 6B illustrates the plunger in a raised position, whereby the valve is open as there is defined a passage between the diaphragm 106 and the weir 104 which allows for fluid communication between the inlet port 102 and the outlet port 112.

In known fluid diverter systems, the flowing medium may be, for instance, diverted by the use of two valves connected to each other by means of a tee branch fitting defining an inlet passage in flow communication with two outlet passages or, alternatively, by the use of a multiported valve, such as a three-way valve. Basically, both systems operate by closing a closure member to block fluid flow through one outlet passage, thereby directing the incoming flow to the other outlet passage. One problem associated with these systems is that some of the fluid remains trapped within the closed outlet passage, upstream of the closure member, thereby giving rise to bacteriological growth and crystallisation of chemical processed media. Obviously, this situation is not acceptable in pharmaceutical, biotech and photo emulsion applications where cleanliness and sterility are essential.

In FIG. 7, two diaphragm valves 100 are used to divert the fluid flowing in an inlet pipe 114 to either one of the inlet ports 102 of the diaphragm valves 100. In FIG. 7, the upper valve 100 is closed while the lower valve 100 is open. This arrangement causes dead lag or stagnation of fluid at the inlet side of the closed valve, as indicated by the grey area indentified by reference numeral 116 in FIG. 7.

Accordingly, attempts have been made to reduce the amount of stagnant fluid in such diverter piping systems. For instance, U.S. Pat. No. 5,273,075 issued on Dec. 23, 1993 to Skaer and U.S. Pat. No. 5,427,150 issued on Jun. 27, 1995 to Skaer et al. both disclose a multiported diaphragm valve. Such multiported diaphragm valves are schematically represented in FIG. 8, wherein a multiported diaphragm valve 120 comprises a valve body 122 defining an inlet port 124 and two outlet ports 126. The inlet port 124 opens onto a chamber 128 which is in flow communication with both outlet ports 126. A pair of diaphragms 130 are provided for directing the fluid flow emerging from the chamber 128 through one of the two outlet ports 126. This arrangement still leaves a stagnant area upstream of the closed diaphragm, as shown at reference numeral 132 in FIG. 8.

Although the multiported diaphragm valves described in the above mentioned Patents decrease the amount of fluid which remains stagnant in the portion of the closed fluid passage located immediately upstream of the diaphragm associated therewith, it has been found that there is a need for a new multiported valve which is adapted to virtually eliminate the presence of stagnant fluids within the valve.

SUMMARY OF THE INVENTION

It is therefore an aim of the present invention to provide a fluid diverter system which is adapted to improve drainage therethrough.

It is also an aim of the present invention to provide a multiported valve which has a new inlet configuration.

It a further aim of the present invention to provide such a valve which is relatively simple and economical to manufacture.

Therefore, in accordance with the present invention, there is provided a diverter valve comprising a valve body defining flow path means including inlet means and first and second passage means located downstream of said inlet means and being in flow communication with said inlet means for dividing an incoming fluid flow into two separate streams, the first and second passage means operatively communicating with respective outlet means, closure means for closing fluid flow through a selected one of said first and second passage means, and bypass passage means provided in said valve body and extending between said first and second passage means upstream of said closure means, said flow path means being adapted to create turbulence in the fluid flow at an entrance area of said bypass passage means.

Also in accordance with the present invention, there is provided a fluid diverter system comprising an inlet fluid passage means, first and second fluid passage means in flow communication with said inlet fluid passage means and downstream thereof, closure means for closing fluid flow through a selected one of said first and second fluid passage means, first and second outlet means downstream of said closure means and in fluid communication respectively with first and second fluid passage means, and bypass passage means extending between said first and second fluid passage means upstream of said closure means, said first and second fluid passage means and said bypass passage means being adapted to create turbulence in the fluid flow at an entrance area of said bypass passage means.

BRIEF DESCRIPTION OF THE DRAWINGS

Having thus generally described the nature of the present invention, reference will now be made to the accompanying drawings, showing by way of illustration a preferred embodiment thereof, and in which:

FIG. 4 is a cross-sectional view taken along line 4—4 of FIG. 1;

FIG. 5 is a schematic cross-sectional view of a diverter piping system in accordance with a second embodiment of the present invention;

DESCRIPTION OF THE PREFERRED EMBODIMENTS

Figure 1:
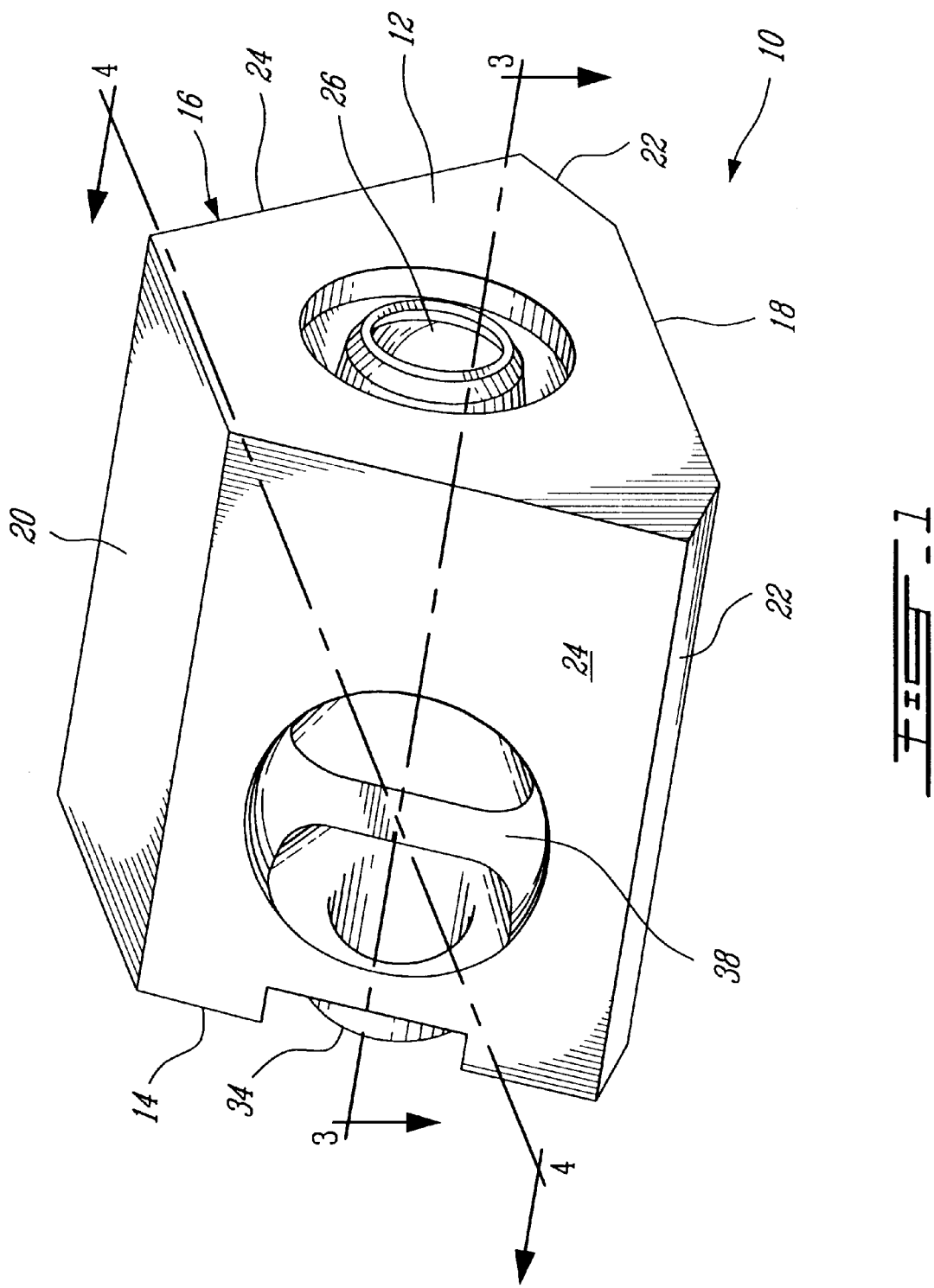
FIG. 1 is a perspective view of a valve body having a fluid passage arrangement in accordance with the present invention.

Now referring to the drawings, and in particular to FIG. 1, a valve body in accordance with the present invention and generally designated by numeral 10 will be described.

The valve body 10 comprises a pair of front and rear walls 12 and 14, and a pair of side walls 16 extending between a base portion 18 and a top portion 20. As seen in FIG. 4, each side wall 16 includes a lower portion 22 extending at an obtuse angle θ from the base portion 18 and an upper portion 24 extending at an acute angle φ from the lower portion 22. It must be noted that the lower portions 22 are not essential and are even absent from most sizes of valve bodies.

Figure 2:
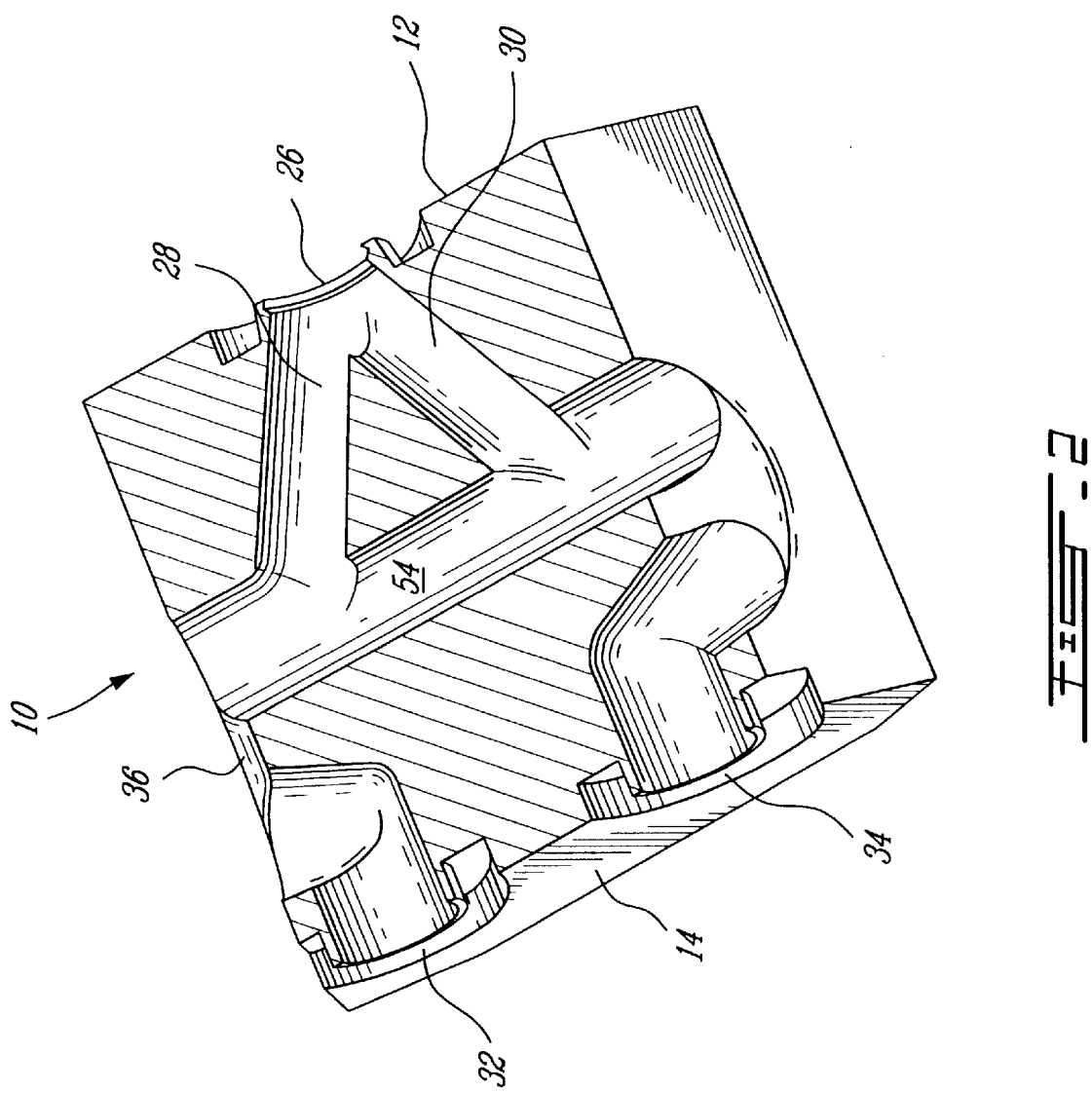
FIG. 2 is a perspective cross-sectional view of the valve body of FIG. 1, showing the fluid passage arrangement thereof.
Figure 3:
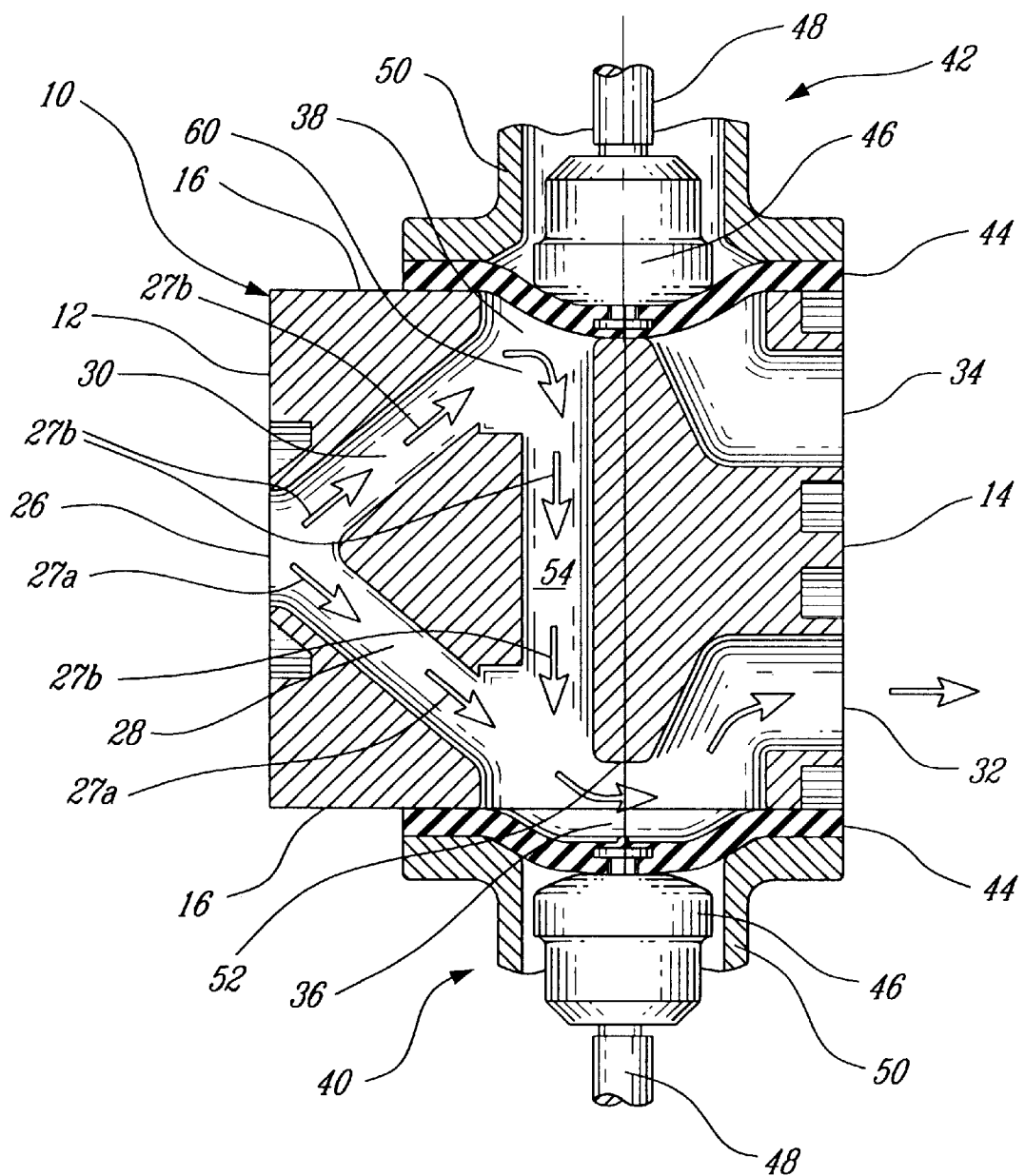
FIG. 3 is a schematic cross-sectional view taken along line 3—3 of FIG. 1, showing a pair of closure members coupled to the valve body thereby forming a multiported diaphragm valve adapted for diverting a fluid flow.
Figures 6A, 6B:
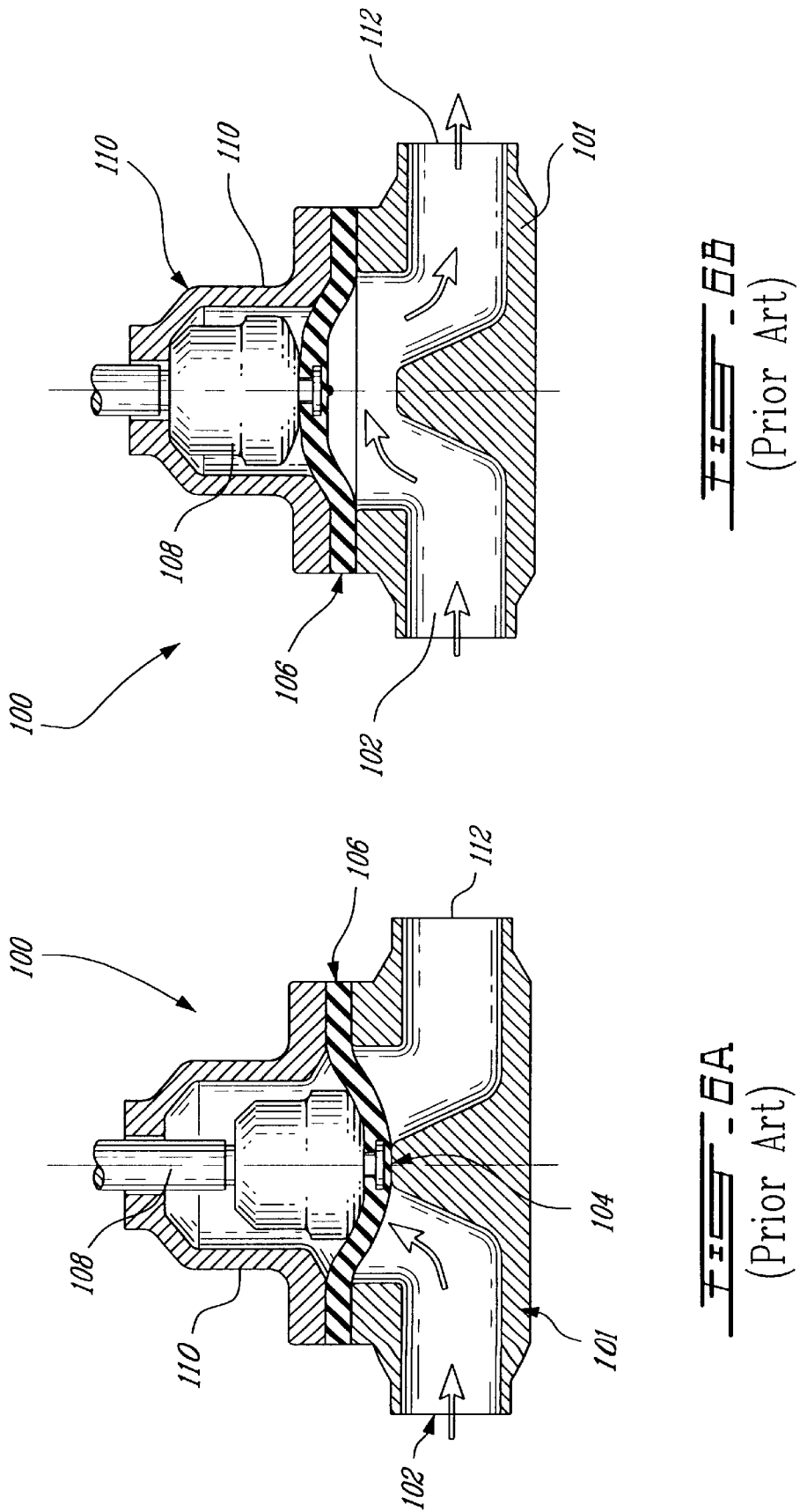
FIGS. 6A and 6B are schematic longitudinal cross-sectional views of a conventional diaphragm valve shown respectively in closed and open positions thereof.
Figure 7:
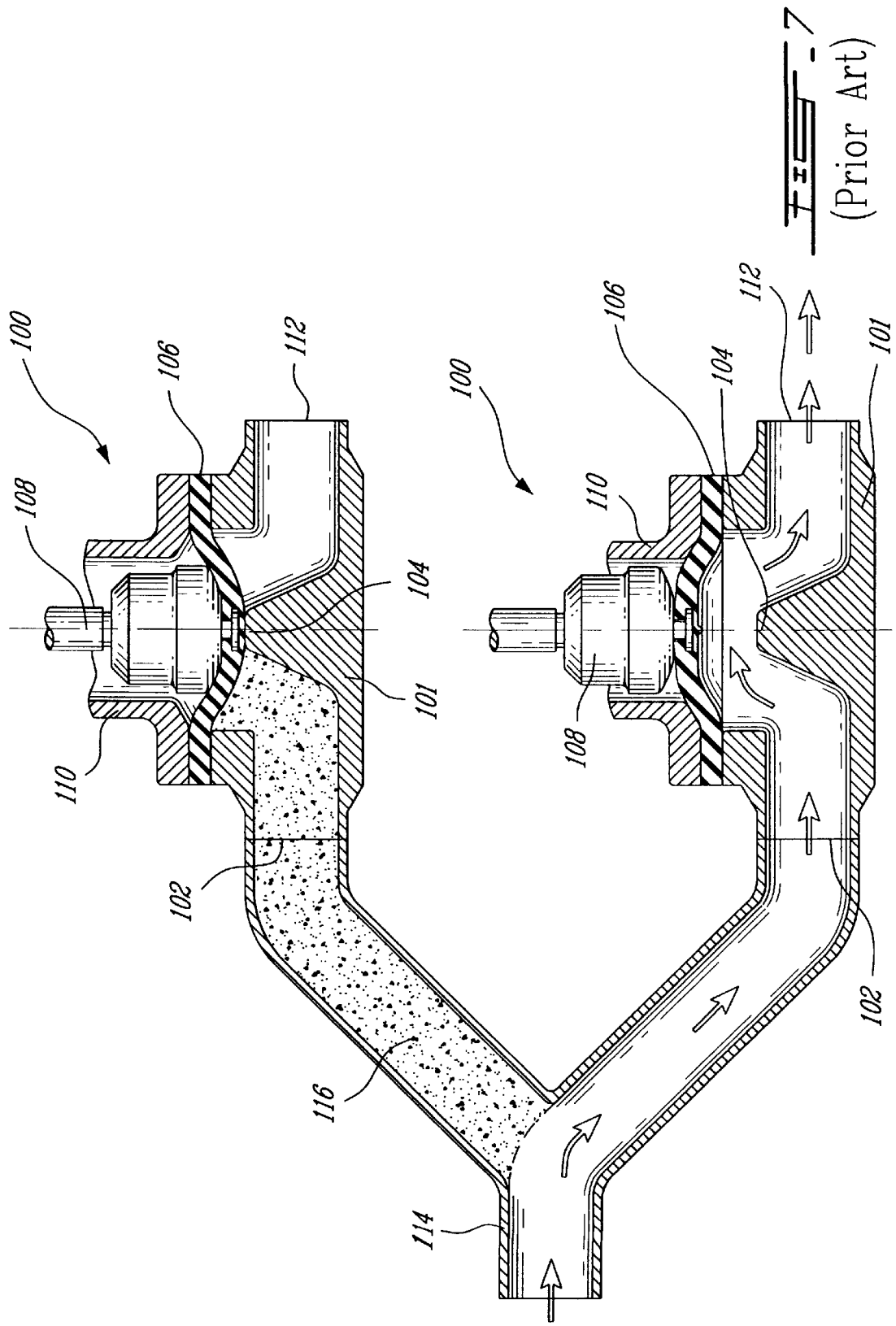
FIG. 7 is a schematic longitudinal cross-sectional view of a conventional fluid diverter system using two diaphragm valves.
Figure 8:
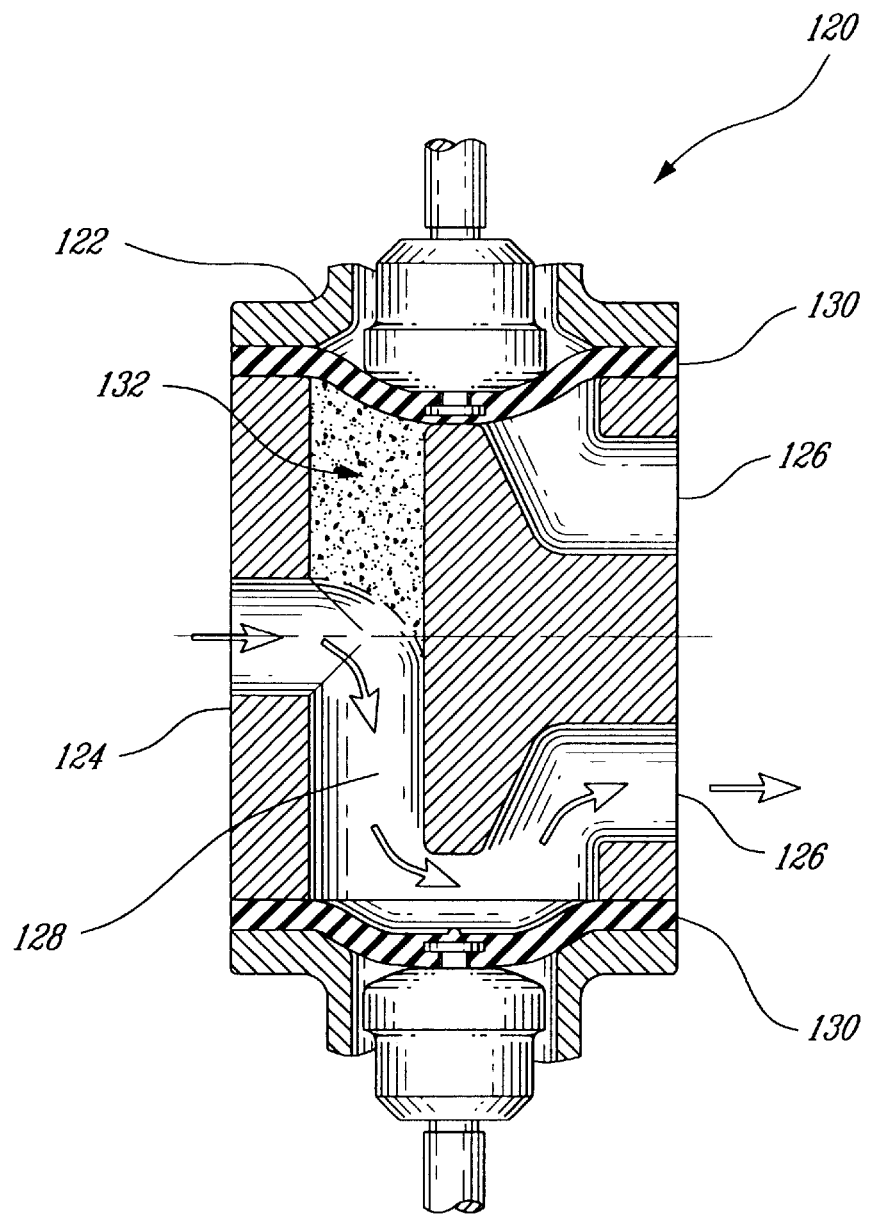
FIG. 8 is a schematic longitudinal cross-sectional view of a conventional diverter valve of the tee inlet port type.

With reference to FIGS. 1 to 3, the front wall 12 defines an inlet port 26 which is adapted to be coupled to a pipe or the like for receiving a fluid flow. The inlet port 26 opens onto first and second diverging fluid passages 28 and 30 defined in the valve body 10 for separating the incoming fluid flow into two separate streams, as illustrated by arrows 27a and 27b in FIG. 3.

The rear wall 14 of the valve body 10 defines first and second outlet ports 32 and 34 which are respectively in flow communication with the first and second fluid passages 28 and 30. It is noted that the inlet port 26 and the outlet ports 32 and 34 may be threaded, flanged or left smooth for welding or provided with other port configurations, depending on the desired coupling to a given piping system.

The first and second fluid passages 28 and 30 are respectively intersected by openings 36 and 38 defined in the side walls 16. First and second closure members 40 and 42 are respectively disposed in the openings 36 and 38 for controlling the fluid flow from the first and second fluid passages 28 and 30 to the outlet ports 32 and 34. More particularly, the closure members 40 and 42 each include a diaphragm 44 which may be mechanically deflected by the pressing action of a conventional compressor 46 mounted at the end of a stem 48 which extends through a bonnet 50.

The first and second fluid passages 28 and 30 each define a weir 52 against which the diaphragm 44 may be pressed to block the fluid flow therethrough, as it is well known in the art. Accordingly, a fluid passing through the inlet port 26 may be directed to one or the other of the first and second outlet ports 32 and 34 by displacing one of the diaphragms 44 to a closed position thereof. For instance, when the second closure member 42 is displaced against the weir 52 of the second fluid passage 30 to block the flow through the second outlet port 34, the fluid flow is diverted toward the first outlet port 32, as illustrated in FIG. 3.

To prevent the accumulation of stagnant fluid within the valve body 10, a bypass passage 54 is defined between the first and second fluid passages 28 and 30. The bypass passage 54 extends across the valve body 10 in the vicinity of the first and second closure members 40 and 42 and, more particularly, immediately upstream of the weirs 52 of the first and second fluid passages 28 and 30. The bypass passage 54 can have a larger, smaller or similar cross-sectional area than that of each of the first and second fluid passages 28 and 30 which are in turn designed to have respective flow coefficients $C_v$ which are less than that of each of the inlet pipe (not shown) connected to the inlet port 26 (on the upstream side thereof) without causing any additional friction. It is noted that the first and second fluid passages 28 and 30 along with the bypass passage 54 each have a generally cylindrical configuration.

Accordingly, for the situation illustrated in FIG. 3, the fluid passing through the inlet port 26 is divided into two separate streams 27a and 27b with stream 27b being directed towards the closed diaphragm 44, namely the second closure member 42. As the flow coefficients $C_v$ for the first and second fluid passages 28 and 30 are less than that of the inlet pipe (not shown), the velocity of the streams 27a and 27b is increased through the first and second fluid passages 28 and 30. Then, stream 27b circulates through the bypass passage 54 into the open passage, in this particular case the first fluid passage 28. The cross-sectional dimensions of the bypass passage 54 cause a decrease or change in the velocity of the stream 27b, thereby creating a small turbulence zone at the junction of the bypass passage 54 and the second fluid passage 30, in the case of FIG. 3. This turbulence zone, in the arrangement of FIG. 3, is located generally in the area designated by reference numeral 60. This ensures a constant flow and a "washing effect" on the closed diaphragm 44, i.e. the second closure member 42.

Although the change of velocity from the first and second fluid passages 28 and 30 to the bypass passage 54 for the above described embodiment is achieved by providing a bypass passage 54 having cross-sectional dimensions which are different from that of the first and second fluid passages 28 and 30, it is understood that this may be also achieved solely by having $C_v$ coefficients for the first and second fluid passages 28 and 30 which are different from that of the bypass passage 54.

It is also noted that the directional change imparted to the fluid flow at the junction of the bypass passage 54 and the second fluid passage 30 may be sufficient to promote turbulence. Alternatively, the shape of the entrance of the bypass passage 54 may be designed to ensure that turbulence in the fluid is created at the junction of the bypass passage 54 and the second fluid passage 30 to thus ensure active flow through the bypass passage 54.

When the outlet port 34 is open and the outlet port 32 is closed, the entrance of the bypass passage 54 is at the junction thereof with the second fluid passage 28, adjacent to the diaphragm 44 (i.e. the closed one), whereat the turbulence occurs.

The above described valve arrangement is particularly well suited for photo emulsion, pharmaceutical and biotech process applications where stagnant media tend to crystallise under the edges of the closed diaphragm 44 thereby altering the operation of the piping system and the quality of the processed media.

FIG. 5 illustrates a second embodiment of the present invention wherein the first and second fluid passages 28 and 30 and the bypass passage 54 are provided in the form of tubular conduits 80, 82 and 84 instead of being defined in a unique valve body. A pair of valves 86 and 88 are provided for blocking or allowing the flow of fluid through the first fluid passage 80 and the second fluid passage 82, respectively. For illustrative purposes, valve 88 is closed, whereas valve 86 is opened.

We claim:

1. A diverter valve comprising a valve body defining flow path means including inlet means and first and second passage means located downstream of said inlet means and being in flow communication with said inlet means for dividing an incoming fluid flow into two separate streams, said first and second passage means operatively communicating with respective outlet means, closure means for closing fluid flow through a selected one of said first and second passage means, and bypass passage means provided in said valve body and extending between said first and second passage means upstream of said closure means, said flow path means being adapted to create turbulence in the fluid flow at an entrance area of said bypass passage means.

2. A diverter valve as defined in claim 1, wherein said entrance area of said bypass passage means is contiguous to said closure means.

3. A diverter valve as defined in claim 1, wherein said bypass passage means is adapted to change a velocity of a fluid flowing therethrough.

4. A diverter valve as defined in claim 3, wherein said bypass passage means defines a cross-sectional flow area which is different from that of said first and second passage means.

5. A diverter valve as defined in claim 1, wherein said first and second passage means have respective flow coefficients $C_v$ which are different from that of said bypass passage means.

6. A diverter valve as defined in claim 1, wherein said entrance area of said bypass passage means is shaped such as to impart turbulence to the fluid flow passing therethrough.

7. A diverter valve as defined in claim 1, wherein said closure means include first and second closure members, said first closure member being adapted to selectively engage a seating surface of said first passage means to block fluid flow therethrough, while said second closure member being adapted to selectively engage a seating surface of said second passage means to block fluid flow therethrough.

8. A diverter valve as defined in claim 7, wherein said first and second closure members each include a diaphragm displaceable between open and closed positions by operation of a pressure member.

9. A diverter valve as defined in claim 8, wherein said first and second passage means each define a weir against which said diaphragm may be pressed in said closed position.

10. A diverter valve as defined in claim 9, wherein said bypass passage means is located immediately upstream of said weir of each of said first and second passage means.

11. A fluid diverter system comprising an inlet fluid passage means, first and second fluid passage means in flow communication with said inlet fluid passage means and downstream thereof, closure means for closing fluid flow through a selected one of said first and second fluid passage means, first and second outlet means downstream of said closure means and in fluid communication respectively with first and second fluid passage means, and bypass passage means extending between said first and second fluid passage means upstream of said closure means, said first and second fluid passage means and said bypass passage means being adapted to create turbulence in the fluid flow at an entrance area of said bypass passage means.

12. A fluid diverter system as defined in claim 11, wherein said entrance area of said bypass passage means is contiguous to said closure means.

13. A fluid diverter system as defined in claim 11, wherein said inlet fluid passage means, said first and second fluid passage means and said bypass passage means are defined in a unitary valve body.

14. A fluid diverter system as defined in claim 11, wherein said bypass passage means is adapted to change a velocity of a fluid flowing therethrough.

15. A fluid diverter system as defined in claim 14, wherein said bypass passage means defines a cross-sectional flow area which is different from that of said first and second fluid passage means.

16. A fluid diverter system as defined in claim 11, wherein said first and second fluid passage means have respective flow coefficients $C_v$ which are different from that of said bypass passage means.

17. A fluid diverter system as defined in claim 11, wherein said entrance area of said bypass passage means is shaped such as to impart turbulence to the fluid flow passing therethrough.

18. A fluid diverter system as defined in claim 13, wherein said closure means include first and second closure members, said first closure member being adapted to selectively engage a seating surface of said first fluid passage means to block fluid flow therethrough, while said second closure member being adapted to selectively engage a seating surface of said second fluid passage to block fluid flow therethrough.

19. A fluid diverter system as defined in claim 18, wherein said first and second closure members each include a diaphragm displaceable between open and closed positions by operation of a pressure member.

20. A fluid diverter system as defined in claim 19, wherein said first and second fluid passage means each define a weir against which said diaphragm may be pressed in said closed position.

21. A fluid diverter system as defined in claim 20, wherein said bypass passage means is located immediately upstream of said weir of each of said first and second fluid passage means.

* * * * *

UNITED STATES PATENT AND TRADEMARK OFFICE
CERTIFICATE OF CORRECTION

PATENT NO.     :6,024,123
DATED          :February 15, 2000
INVENTOR(S)    :Marc Weissfloch; Kondandaraman Balasubramanian It is certified that errors appear in the above-identified patent and that said Letters Patent is hereby corrected as shown below:

On the title page, item:
    [30]    Foreign Application Priority Data
           October 6, 1998 (CA) Canada............2,249,815

Signed and Sealed this

Twenty-third Day of January, 2001

Attest:

Q. TODD DICKINSON

*Attesting Officer*       *Commissioner of Patents and Trademarks*